United States Patent [19]

Munn et al.

[11] Patent Number: 4,803,062

[45] Date of Patent: Feb. 7, 1989

[54] METHOD FOR PRODUCING TUNGSTEN HEXACHLORIDE

[75] Inventors: Robin W. Munn, Sayre; Robert P. McClintic, Monroeton; Kenneth T. Reilly, Towanda, all of Pa.

[73] Assignee: GTE Products Corporation, Stamford, Conn.

[21] Appl. No.: 181,885

[22] Filed: Apr. 14, 1988

[51] Int. Cl.⁴ .............................................. C01G 37/00
[52] U.S. Cl. ....................................... 423/492; 423/60
[58] Field of Search ................................. 423/492, 60

[56] References Cited

U.S. PATENT DOCUMENTS 3,294,482 12/1986 Lerner ................................. 423/492
3,407,031 10/1968 Fuerer et al. ....................... 423/492
3,711,592 1/1973 Jonsson et al. ..................... 423/492
3,903,238 9/1975 Grinder et al. ..................... 423/492

Primary Examiner—Gregory A. Heller
Attorney, Agent, or Firm—Donald R. Castle; L. Rita Quatrini

[57] ABSTRACT

In a method for producing tungsten hexachloride which comprises reacting tungsten with chlorine gas at a temperature sufficient to result in the conversion of the tungsten to tungsten hexachloride, the improvement comprising reacting tungsten in the form of pressed pieces to convert the pieces to tungsten hexachloride having an oxygen content of less than about 0.5% by weight with the rate of conversion to tungsten hexachloride being at least about 2.3 times greater than the rate of conversion when the tungsten is in an unpressed form.

1 Claim, No Drawings

METHOD FOR PRODUCING TUNGSTEN HEXACHLORIDE

This invention relates to a method for producing tungsten hexachloride from tungsten billets as opposed to using tungsten metal powder as the starting material. This results in a higher rate of reaction and a lower oxygen content in the tungsten hexachloride as opposed to the tungsten hexachloride produced from tungsten powder.

BACKGROUND OF THE INVENTION

Tungsten hexachloride is used as a catalyst, in the chemical vapor deposition of tungsten, and in the production of high purity fine particle size tungsten metal powder.

Tungsten hexachloride ($WCl_6$) is typically produced by passing chlorine ($Cl_2$) over a quartz boat filled with tungsten powder condensed and collected as powder at the exit end of the reaction furnace. When the tungsten powder in the boat is completely consumed by the reaction, the quartz furnace tube must be opened to replace the empty boat with a filled one. There are several disadvantages in using tungsten powder for the feed material. First, the powder must be placed in a suitable container in order to be effectively stoked into the hot zone of the furnace tube. Quartz boats are typically used since quartz resists attack by chlorine at high temperature. However, the boats are fragile and will gradually deteriorate so that they must be frequently repaired or replaced. A second disadvantage is that the reaction rate is slow. The production rate for tungsten hexachloride seems to be primarily dependent on the amount of tungsten surface area exposed to the flowing chlorine in the furnace tube. Since the powder is contained in a boat, only the top surface is available for reaction. Finally since the furnace tube must be opened frequently to replace empty boats, the tungsten hexachloride product can easily be contaminated by oxygen, forming tungsten oxychloride. To reduce the oxygen content of the product it must be boiled and recrystallized. This reduces the yield since some tungsten oxychloride escapes during the boiling of pure tungsten hexachloride. Minimizing the oxygen contamination increases the formation of pure tungsten hexachloride.

It would be desirable to produce tungsten hexachloride without the above disadvantages.

SUMMARY OF THE INVENTION

In accordance with one aspect of this invention, there is provided an improvement in a method for producing tungsten hexachloride which comprises reacting tungsten with chlorine gas at a temperature sufficient to result in the conversion of the tungsten to tungsten hexachloride, the improvement comprising reacting tungsten in the form of pressed pieces to convert the pieces to tungsten hexachloride having an oxygen content of less than about 0.5% by weight with the rate of conversion to tungsten hexachloride being at least 2.3 times greater than the rate of conversion when the tungsten is in an unpressed form.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The present invention provides a method for producing tungsten hexachloride from tungsten in the form of billets as opposed to tungsten metal powder. This affords a number of advantages. The use of costly boats is eliminated because the billets can be introduced directly into the furnace without a container. Also, without a boat, the billets have nearly their entire surfaces exposed to the chlorine gas so that the rate of reaction is more than doubled. Still another advantage in using billets is that since the density of the billets is several times greater than powder, more tungsten can be loaded into the furnace at one time and therefore the number of reloadings is reduced. As a result less air is introduced into the furnace and therefore the tungsten hexachloride product is significantly lower in oxygen than if tungsten powder were used as the starting material. This eliminates the need for further purification steps of boiling and recrystallization.

The starting materials for this procedure are pressed tungsten pieces or billets. In general, these can be of any convenient shape and size. For example, solid rectangular bars work well in horizontal tube reactors. Other compacted forms such as cylinders, pellets, rods, etc. can work equally well depending on the reactor configuration. The pressure required to form the pieces from tungsten powder must be sufficient to produce pieces strong enough to be loaded into the reactor without breaking. This pressure will vary depending on the type of press and the morphology of the tungsten powder. Anyone skilled in the art would know how to press parts so that they are suitable for handling in this operation. Preferably the pieces are pressed without additives such as wax to minimize contamination in the tungsten hexachloride product. Also the pieces should be large enough so that no boat is required to contain them in the reactor.

The formed billets or pieces are loaded into a reactor and reacted with chlorine gas to form the tungsten hexachloride product. Because of the increase in effective tungsten surface area of the pieces exposed to the chlorine gas the reaction rates are greater than if tungsten powder is used.

The reaction conditions depend on the design and size of the equipment and on the size of the charge. As a non-limiting illustrative example, in a 2" diameter reactor having an 18" heated zone and containing 5 kg of tungsten billets, the temperature is typically free from about 800° C. to about 900° C. with from about 860° C. to about 880° C. being preferred. Higher temperatures result in faster tube corrosion. Lower temperatures result in longer reaction times. The reaction times are typically from about 20 to about 30 hours with from about 22 hours to about 26 hours being preferred. The flow rate of chlorine gas is typically from about 0.8 to about 1.0 SLPM, (standard liters per minute). These conditions result in essentially all of the tungsten being converted to tungsten hexachloride. The oxygen content of the resulting tungsten hexachloride product is less than about 0.5% by weight and more typically from about 0.1% to about 0.5% by weight as opposed to typical levels of from about 0.5% to about 1.0% by weight in material produced from tungsten in the unpressed form, most typically, in powder form.

To more fully illustrate this invention, the following nonlimiting example is presented.

EXAMPLE

Tungsten powder is mechanically compacted in a dual acting opposed ram and die type press using about 600 tons of force. The resulting bars are about ½"×½"×about 18" long and weigh about 2.5 kg each. No binder is used. Two bars are loaded directly into a 50 mm quartz tube which is resting in a horizontal tube furnace. The 24" hot zone of the furnace is set at from about 860° C. to about 880° C. The tube is sealed and after purging with nitrogen gas, chlorine gas is allowed to flow through the tube at a rate of about 1 liter/minute. As the chlorine gas flows past the hot tungsten bars, tungsten hexachloride vapor is formed which is pushed out of the furnace where it is condensed and collected. After about 26 hours the bars are completely consumed which equates to a tungsten hexachloride production rate of about 415 g/hr. Previously a 500 g boatload of tungsten powder subjected to the same temperature and chlorine rate would last about 6 hours for a tungsten hexachloride formation rate of about 180 g/hr. The reaction rate for the bars is about 2.3 times greater than for the powder. Also the tungsten hexachloride product from the bars has little or no contamination oxygen present. Since tungsten hexachloride powder is black, the presence of brown tungsten oxychlorides is easily detected by visual inspection. Typically the tungsten hexachloride product from tungsten powder in boats contains much more off-color material. The difference in the oxygen containing species between material from tungsten powder and material from tungsten bars is that the reactor is opened and reloaded when the powder in boats is used. For example, the furnace of the present example accommodates a 500 g load when tungsten is in the form of powder and it accommodates a 5,000 g load when the tungsten is in the form of pressed bars. Therefore in order to process the same amount of tungsten in powder form, the furnace would have to be opened ten times more, and therefore the potential for contamination with oxygen is ten times greater with powder than with pressed bars.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a method for producing tungsten hexachloride comprising reacting tungsten with chlorine gas at a temperature sufficient to result in the conversion of said tungsten to tungsten hexachloride, the improvement comprising reacting tungsten in the form of pressed pieces to convert said pieces to tungsten hexachloride having an oxygen content of less than about 0.5% by weight with the rate of conversion to said tungsten hexachloride being at least about 2.3 times greater than the rate of conversion when said tungsten is in an unpressed form.

* * * * *